US009704255B2

(12) United States Patent
Unten et al.

(10) Patent No.: US 9,704,255 B2
(45) Date of Patent: Jul. 11, 2017

(54) THREE-DIMENSIONAL SHAPE MEASUREMENT DEVICE, THREE-DIMENSIONAL SHAPE MEASUREMENT METHOD, AND THREE-DIMENSIONAL SHAPE MEASUREMENT PROGRAM

(71) Applicant: TOPPAN PRINTING CO., LTD., Taito-ku (JP)

(72) Inventors: Hiroki Unten, Taito-ku (JP); Tatsuya Ishii, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 14/886,896

(22) Filed: Oct. 19, 2015

(65) Prior Publication Data
US 2016/0042523 A1 Feb. 11, 2016

Related U.S. Application Data

(63) Continuation of application No. PCT/JP2014/060591, filed on Apr. 14, 2014.

(30) Foreign Application Priority Data

Apr. 19, 2013 (JP) ................. 2013-088555

(51) Int. Cl.
*G06T 7/00* (2006.01)
*G01B 11/24* (2006.01)
(Continued)

(52) U.S. Cl.
CPC ............ *G06T 7/0075* (2013.01); *G01B 11/24* (2013.01); *G06T 7/593* (2017.01); *G06T 17/20* (2013.01);
(Continued)

(58) Field of Classification Search
None
See application file for complete search history.

(56) References Cited

U.S. PATENT DOCUMENTS 8,259,161 B1 9/2012 Huang et al.
8,666,119 B1 * 3/2014 Mallet .................. G06T 7/2086
345/419
(Continued)

FOREIGN PATENT DOCUMENTS

JP 10-23465 A 1/1998
JP 2008-203091 A 9/2008
(Continued)

OTHER PUBLICATIONS

International Search Report issued Jul. 15, 2014 in PCT/JP2014/060591, filed Apr. 14, 2014.
(Continued)

*Primary Examiner* — Delomia L Gilliard
(74) *Attorney, Agent, or Firm* — Oblon, McClelland, Maier & Neustadt, L.L.P.

(57) ABSTRACT

A device for measuring a three-dimensional shape includes an imaging unit which sequentially outputs a first two-dimensional image being captured and outputs a second two-dimensional image according to an output instruction, the second two-dimensional image having a setting different from a setting of the first two-dimensional image, an output instruction generation unit which generates the output instruction based on a shape defect ratio obtained by generating a three-dimensional model based on the second two-dimensional image outputted by the imaging unit and viewing a three-dimensional model from a viewpoint at which the first two-dimensional image is captured, and a storage unit which stores the second two-dimensional image outputted by the imaging unit.

8 Claims, 9 Drawing Sheets

(51) Int. Cl.
  *G06T 17/20* (2006.01)
  *H04N 5/225* (2006.01)
  *H04N 13/02* (2006.01)
  *G06T 7/593* (2017.01)

(52) U.S. Cl.
  CPC ....... *H04N 5/2256* (2013.01); *H04N 13/0221* (2013.01); *H04N 13/0282* (2013.01); *G06T 2207/10012* (2013.01); *G06T 2207/10028* (2013.01)

(56) References Cited

U.S. PATENT DOCUMENTS

| | | | |
|---|---|---|---|
| 2001/0014171 A1* | 8/2001 | Iijima | G06T 7/0065 382/154 |
| 2003/0007680 A1 | 1/2003 | Iijima et al. | |
| 2009/0002504 A1 | 1/2009 | Yano et al. | |
| 2012/0177283 A1* | 7/2012 | Wang | G06T 17/00 382/154 |
| 2012/0177284 A1* | 7/2012 | Wang | G06T 7/0075 382/154 |
| 2013/0046506 A1* | 2/2013 | Takabayashi | G06T 7/0018 702/155 |

FOREIGN PATENT DOCUMENTS

| | | |
|---|---|---|
| JP | 2009-511897 A | 3/2009 |
| JP | 2009-168536 A | 7/2009 |
| JP | 2009-530604 A | 8/2009 |
| JP | 2011-527790 A | 11/2011 |
| JP | 2012-15674 A | 1/2012 |
| JP | 2012-28949 A1 | 2/2012 |

OTHER PUBLICATIONS

Unten et al., "-Stereo Moving-shot Modeling System (SM2S)—A Practical VR-model Generation Method by Utilizing Moving-shots with Stereo Camera—Stereo Moving-shot Modeling System (SM2S)- ", TVRSJ, vol. 12, No. 2, 2007, 9 pages (with English abstract).

Izadi et al., "KinectFusion: Real-time 3D Reconstruction and Interaction Using a Moving Depth Camera", ACM Symposium on User Interface Software and Technology, Oct. 2011, 10 pages [Searched on Apr. 15, 2013], Internet <URL: http://research.microsoft.com/apps/pubs/default.aspx?id=155416>.

Extended European Search Report issued Nov. 23, 2016 in Patent Application No. 14785362.6.

Satoshi Futami, et al., "3D Modeling of Real Environments by Autonomous Mobile Robot With Stereo Vision," International Conference on Image Processing (ICIP), XP010607459, (2002), pp. 1-856 to 1-859.

* cited by examiner

THREE-DIMENSIONAL SHAPE MEASUREMENT DEVICE, THREE-DIMENSIONAL SHAPE MEASUREMENT METHOD, AND THREE-DIMENSIONAL SHAPE MEASUREMENT PROGRAM

CROSS-REFERENCE TO RELATED APPLICATIONS

The present application is a continuation of International Application No. PCT/JP2014/060591, filed Apr. 14, 2014, which is based upon and claims the benefits of priority to Japanese Application No. 2013-088555, filed Apr. 19, 2013. The entire contents of these applications are incorporated herein by reference.

BACKGROUND OF THE INVENTION

Field of the Invention

The present invention relates to a three-dimensional shape measurement device, a three-dimensional shape measurement method, and a three-dimensional shape measurement program.

Discussion of the Background

Non-Patent Literature 1 describes an example of a technique of generating a three-dimensional model of an object on the basis of a plurality of two-dimensional images containing the object imaged while an imaging unit is moved. In the three-dimensional shape measurement system described in Non-Patent Literature 1, a three-dimensional model of an object is generated as follows. Firstly, the entire object is imaged as a dynamic image while a stereo camera configuring an imaging unit is moved. Such a stereo camera, which is also called a binocular stereoscopic camera, refers to herein a device to image an object from a plurality of different perspectives. Then, three-dimensional coordinate values corresponding to each pixel are calculated based on one set of two-dimensional images, for each of predetermined frames. It should be noted that the three-dimensional coordinate values calculated then are represented as a plurality of three-dimensional coordinates different for each perspective of the stereo camera. Thus, in the three-dimensional shape measurement system described in Non-Patent Literature 1, movement of the perspective of the stereo camera is estimated by tracking a feature point group contained in a plurality of two-dimensional images captured as dynamic images across a plurality of frames. Then, the three-dimensional model represented by a plurality of coordinate systems is integrated into a single coordinate system on the basis of the result of estimating the movement of the perspective to thereby generate a three-dimensional model of the object.

Non-Patent Literature 2 describes an example of a technique of generating a three-dimensional model of an object on the basis of a plurality of depth images (also called range images, or the like) acquired by moving an infrared depth sensor (hereinafter, referred to as an imaging unit). Such a depth image herein refers to an image representing pixel-basis distance information to the measured object. In the three-dimensional shape measurement system described in Non-Patent Literature 2, the infrared depth sensor is configured with an infrared projection unit, an infrared imaging unit, and a signal processing unit. The infrared projection unit projects a random speckle pattern to an object, and the reflected light is imaged by the infrared imaging unit. Then, based on deviation and change in the shape of the random speckle pattern imaged by the infrared imaging unit, the signal processing unit calculates the distance information to the object to thereby generate depth images. The configuration of the infrared depth sensor and the like are described, for example, in Patent Literatures 1 to 3.

A three-dimensional model of an object in the present invention refers a model represented by digitizing in a computer the shape of the object in a three-dimensional space. For example, the three-dimensional model refers to a point group model that reconstructs a surface profile of the object with a set of a plurality of points (i.e., a point group) in the three-dimensional space on the basis of a multi-perspective two-dimensional image or a two-dimensional image in which each pixel represents distance information. Three-dimensional shape measurement in the present invention refers to generating a three-dimensional model of an object by acquiring a plurality of two-dimensional images, and also refers to acquiring a plurality of two-dimensional images for generation of the three-dimensional model of an object.

Patent Literature 1: JP 2011-527790A
Patent Literature 2: JP 2009-511897A
Patent Literature 3: JP 2009-530604A
Non-Patent Literature 1: "Review of VR Model Automatic Generation Technique by Moving Stereo Camera Shot" by Hiroki UNTEN, Tomohito MASUDA, Toru MIHASHI, Makoto ANDO; Journal of the Virtual Reality Society of Japan, Vol. 12, No. 2, 2007
Non-Patent Literature 2: "KinectFusion: Real-time 3D Reconstruction and Interaction Using a Moving Depth Camera," by Shahram Izadi, David Kim, Otmar Hilliges, David Molyneaux, Richard Newcombe, Pushmeet Kohli, Jamie Shotton, Steve Hodges, Dustin Freeman, Andrew Davison, and Andrew Fitzgibbon; October 2011, Publisher: ACM Symposium on User Interface Software and Technology, [Searched on Apr. 15, 2013], Internet <URL: http://research.microsoft.com/apps/pubs/default-.aspx?id=155416>

SUMMARY OF THE INVENTION

According to one aspect of the present invention, a device for measuring a three-dimensional shape includes an imaging unit which sequentially outputs a first two-dimensional image being captured and outputs a second two-dimensional image according to an output instruction, the second two-dimensional image having a setting different from a setting of the first two-dimensional image, an output instruction generation unit which generates the output instruction based on a shape defect ratio obtained by generating a three-dimensional model based on the second two-dimensional image outputted by the imaging unit and viewing a three-dimensional model from a viewpoint at which the first two-dimensional image is captured, and a storage unit which stores the second two-dimensional image outputted by the imaging unit.

According to another aspect of the present invention, a method of measuring a three-dimensional shape, includes controlling an imaging unit to sequentially output a first two-dimensional image being captured and to output a second two-dimensional image having a setting different from a setting of the captured first two-dimensional image, according to an output instruction, generating the output instruction based on a shape defect ratio obtained by generating a three-dimensional model based on the second two-dimensional image outputted by the imaging unit and viewing a three-dimensional model from a viewpoint at which the first two-dimensional image is captured; and storing the second two-dimensional image outputted by the imaging unit.

According to a still another aspect of the present invention, a non-transitory computer-readable medium includes computer executable instructions, wherein the instructions, when executed by a computer, cause the computer to perform a method of measuring a three-dimensional shape, including sequentially outputting a first two-dimensional image being captured, while outputting a second two-dimensional image with a setting different from a setting of the first two-dimensional image, according to an output instruction, generating the output instruction based on a shape defect ratio obtained by generating a three-dimensional model based on the second two-dimensional image outputted by the imaging unit and viewing a three-dimensional model from a viewpoint at which the first two-dimensional image is captured, and storing the second two-dimensional image outputted by the imaging unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
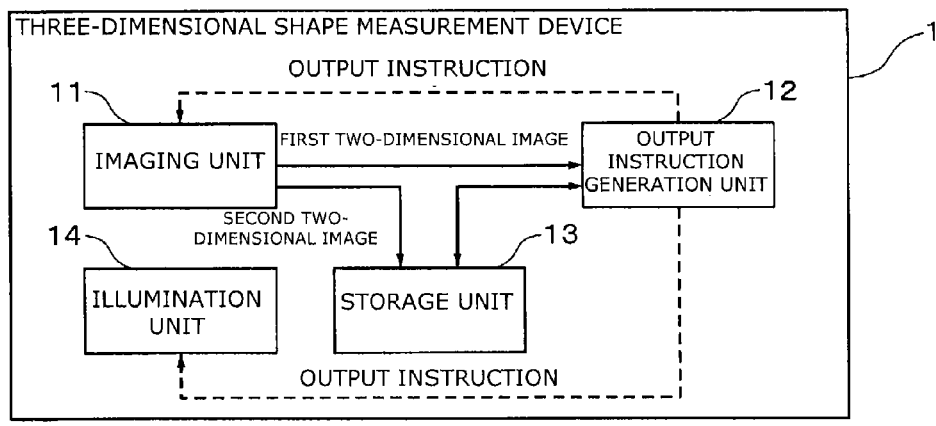
FIG. 1 is a block diagram illustrating a configuration example in one embodiment of the present invention.

The embodiments will now be described with reference to the accompanying drawings, wherein like reference numerals designate corresponding or identical elements throughout the various drawings.

With reference to the drawings, hereinafter is described an embodiment of the present invention. FIG. 1 is a block diagram illustrating a configuration example of a three-dimensional shape measurement device 1 as one embodiment of the present invention. The three-dimensional shape measurement device 1 is provided with an imaging unit 11, an output instruction generation unit 12, a storage unit 13, and an illumination unit 14. The imaging unit 11 sequentially outputs a predetermined captured two-dimensional image (hereinafter, referred to as a first two-dimensional image) and also outputs a two-dimensional image with a setting different from that of the captured first two-dimensional image (hereinafter, referred to as a second two-dimensional image), according to a predetermined output instruction.

In the embodiment of the present invention, a two-dimensional image refers to an image, or a signal or data representing the image, based on each pixel value of an image captured by an image sensor having a plurality of two-dimensionally arranged pixels. The image in this case is a monochrome image (gray image), a color image, an infrared image, a range image, or the like. Setting of a captured two-dimensional image refers to setting information indicating a structure and a format of the image data, or setting information indicating instructions for capturing an image, such as imaging conditions. The setting information indicating a structure and a format of the image data corresponds to information indicating image data specifications, such as resolution of the image (hereinafter also referred to as image resolution), a method of image compression, and a compression ratio, and the like. On the other hand, the setting information indicating instructions for capturing an image corresponds to information indicating, for example, imaging specifications (i.e., instructions for capturing an image), such as imaging resolution, a shutter speed, an aperture, and sensitivity of an image sensor (ISO sensitivity) in capturing an image. In the embodiment of the present invention, imaging resolution refers to the reading resolution of a plurality of pixel signals from the image sensor. An image sensor may have a plurality of combinations of a frame rate and the number of effective output lines, although it depends on the image sensor. In such an image sensor, for example, setting can be made such that the first two-dimensional image is formed from a pixel signal having a small number of effective lines and the second two-dimensional image is formed from a pixel signal having a large number of effective lines. The image resolution mentioned above is the resolution of image data outputted from the imaging unit 11 and thus may coincide with or may be different from the imaging resolution (e.g. may be decreased by a culling process or increased by interpolation in an approximate process). The first two-dimensional image refers to, for example, an image repeatedly and sequentially captured at a predetermined frame rate (i.e., dynamic image). The second two-dimensional image refers to an image with a resolution different from the resolution of the first two-dimensional image (dynamic image or still image), or an image captured under imaging conditions different from those of the first two-dimensional image.

The imaging conditions may include presence/absence of illumination and difference in illumination intensity of the illumination unit 14. These conditions may also be set in combination of two or more. For example, when the second two-dimensional image is captured, the influence of blur can be reduced by casting illumination from or intensifying illumination of the illumination unit 14 while increasing the shutter speed. Alternatively, when the second two-dimensional image is captured, the depth of field can be increased by casting illumination from or intensifying illumination of the illumination unit 14, while increasing the aperture value (F value) (i.e., by narrowing the aperture). In addition, to cope with the image resolution and the imaging resolution, the resolution of the second two-dimensional image can be made higher than the resolution of the first two-dimensional image. In this case, the accuracy of generating a three-dimensional model can be more enhanced by using the second two-dimensional image as an object to be processed in generating the three-dimensional model, and making its resolution higher. At the same time, since the first two-dimensional image is sequentially captured, the frame rate can be easily raised or the amount of data can be decreased by permitting the first two-dimensional image to have a low resolution. For the settings of these imaging conditions, predetermined values for the respective first and second two-dimensional images may be used. Alternatively, information instructing the settings may be appropriately inputted to the imaging unit 11 from the output instruction generation unit 12 or the like.

The imaging unit 11 may also be configured as follows. Specifically, the imaging unit 11 acquires image data having the same resolution as that of the second two-dimensional image when outputting the first two-dimensional image, and temporarily stores the image data in its internal storage unit. Then, the imaging unit 11 extracts predetermined pixels only, and outputs the pixels to the output instruction generation unit 12 and the storage unit 13, as the first two-dimensional image having a resolution lower than that of the second two-dimensional image. Then, when an output instruction is supplied from the output instruction generation unit 12, the imaging unit 11 reads the image data rendered to be the first two-dimensional image corresponding to the output instruction, from its internal storage unit and outputs the readout data, as it is, as a second two-dimensional image with the resolution at the time of capture. Then, the imaging unit 11 deletes, the image data rendered to be the second two-dimensional image inclusive, and the image data captured at an earlier clock time than this image data, from its internal storage unit, according to the output instruction. The storage unit inside the imaging unit 11 has a capacity that is a minimally required necessary capacity for only the storage of the captured image data, as determined by experiment or the like. The captured image data to be stored in this case is captured before the subsequent capture of a second two-dimensional image, following the currently stored one.

In this case, the imaging unit 11 may acquire the image data mentioned above in the form of a dynamic image, or may acquire image data at a predetermined cycle. In this case, the difference in setting between the first and second two-dimensional images is only the image resolution. Accordingly, depending on the surrounding environment for capturing imaging data, for example, imaging conditions, such as a shutter speed, an aperture, and sensitivity of an image sensor in capturing the imaging data, can be set in advance in conformity with the environment. Thus, a user who acquires an image can make settings of the three-dimensional shape measurement device 1 in conformity with the surrounding environment of the moment to be imaged.

The imaging unit 11 that can be used may be one whose focal length can be changed telescopically or in a wide angle, or may be a fixed one. For example, the focal length is changed in accordance with an instruction from the output instruction generation unit 12 and the like. The imaging unit 11 may be provided with an automatic focusing function (i.e., a function of automatically focusing on an object), or may be provided with a manual focusing function. However, in the case of changing a focal length not by an instruction from the output instruction generation unit 12 and the like, the imaging unit 11 is ensured to be able to supply data indicating the focal length to the output instruction generation unit 12 and the like, together with the first and second two-dimensional images, or image data representing the captured images.

The output instruction generation unit 12 generates the output instruction on the basis of the first and second two-dimensional images outputted by the imaging unit 11.

The storage unit 13 is a storage device that stores the second two-dimensional image outputted by the imaging unit 11, in accordance with the output instruction. The storage unit 13 may directly store the second two-dimensional image outputted by the imaging unit 11 in accordance with the output instruction, or may receive and store, via the output instruction generation unit 12, the second two-dimensional image that has been acquired by the output instruction generation unit 12 from the imaging unit 11. The storage unit 13 may store the second two-dimensional image, while storing various types of data (e.g. data indicating a plurality of feature points extracted from the image, data indicating a result of tracking a plurality of feature points extracted from the image, between different frames, three-dimensional shape data reconstructed from the image, and the like) calculated in the course of the process where the output instruction generation unit 12 generates the output instruction. Feature points refer to points that can be easily correlated to each other between stereo images or dynamic images. For example, each feature point is defined to be a point (arbitrarily selected point, first point), or defined to be the color, brightness, or outline information around the point, which is strikingly different from another point (second point) in the image. In other words, each feature point is defined to be one of two points whose relative differences appear to be striking in the image, from the viewpoints of color, brightness, and outline information. Feature points are also called vertexes and the like. As an extraction algorithm to extract feature points from an image, a variety of algorithms functioning as corner detection algorithms are proposed and the algorithm to be used is not particularly limited. However, it is desired that an extraction algorithm is capable of stably extracting a feature point in a similar region even when an image is rotated, moved in parallel, and scaled. As such an algorithm, SIFT (U.S. Pat. No. 6,711,293) or the like is known. The storage unit 13 may be ensured to store the first two-dimensional image, while storing the second two-dimensional image.

The illumination unit 14 is a device illuminating an imaging object of the imaging unit 11. The illumination unit 14 carries out predetermined illumination relative to the imaging object, according to the output instruction outputted by the output instruction generation unit 12, so as to coincide with the timing for the imaging unit 11 to capture the second two-dimensional image. The illumination unit 14 may be a light emitting device that radiates strong light, called flash, strobe, or the like, in a short period of time to the imaging object, or may be a device that continuously emits predetermined light. The predetermined illumination relative to the imaging object performed by the illumination unit 14 according to the output instruction refers to illumination in which the presence or absence of light emission, or large or small amount of light emission depends on the presence or absence of an output instruction. That is to say, the illumination unit 14 emits strong light in a short period of time to the imaging object, or enhances the intensity of illumination according to the output instruction.

As illustrated in FIG. 1, the three-dimensional shape measurement device 1 may be integrally provided with the imaging unit 11, the output instruction generation unit 12, the storage unit 13, and the illumination unit 14. Alternatively, for example, one, or two or more elements (components of the three-dimensional shape measurement device) may be configured by separate devices. For example, the imaging unit 11, the output instruction generation unit 12, the storage unit 13, and the illumination unit 14 may be integrally configured as an electronic device, such as a mobile camera or a mobile information terminal. Alternatively, for example, the imaging unit 11 and a part or the entire storage unit 13 may be configured as a mobile camera, and the output instruction generation unit 12 and a part of the storage unit 13 may be configured as a personal computer or the like. Alternatively, the illumination unit 14 may be omitted, or the illumination unit 14 may be configured as a device separate from the imaging unit 11, e.g., as a stationary illumination device. Alternatively, the illumination unit 14 may be configured by a plurality of light emitting devices.

Further, the three-dimensional shape measurement device 1 may be provided with a wireless or wired communication device, and establish connection between the components illustrated in FIG. 1 via wireless or wired communication lines. Alternatively, the three-dimensional shape measurement device 1 may be provided with a display unit, a tone signal output unit, a display lamp, and an operation unit, not shown in FIG. 1, and have a configuration of outputting an output instruction from the output instruction generation unit 12 to the display unit, the tone output unit, and the display lamp. Thus, when a user operates a predetermined operation device, the second two-dimensional image may be ensured to be captured by the imaging unit 11. That is, in the case where the output instruction generation unit 12 outputs an output instruction, it may be so configured that the imaging unit 11 directly captures the second two-dimensional image in accordance with the output instruction, or that the imaging unit 11 captures the second two-dimensional image in accordance with the output instruction via an operation by the user.

For example, the three-dimensional shape measurement device 1 may be provided with a configuration of carrying out a process of estimating the movement of the three-dimensional shape measurement device 1 on the basis of a plurality of first two-dimensional images. Such a configuration may be provided in the output instruction generation unit 12 (or separately from the output instruction generation unit 12). For example, the estimation of the movement may be carried out by tracking a plurality of feature points contained in the respective first two-dimensional images (e.g. see Non-Patent Literature 1). In this case, as a method of tracking feature points between a plurality of two-dimensional images like dynamic images, several methods, such as the Kanade-Lucas-Tomasi method (KLT method), are widely used. The result of estimating movement can be stored, for example, in the storage unit 13.

The three-dimensional shape measurement device 1 may have a function of obtaining the position information of the own device using, for example, a GPS (global positioning system) receiver or the like, or may have a function of sensing the movement of the own device using an acceleration sensor, a gyro sensor, or the like. For example, the result of sensing the movement can be stored in the storage unit 13.

Figure 2:
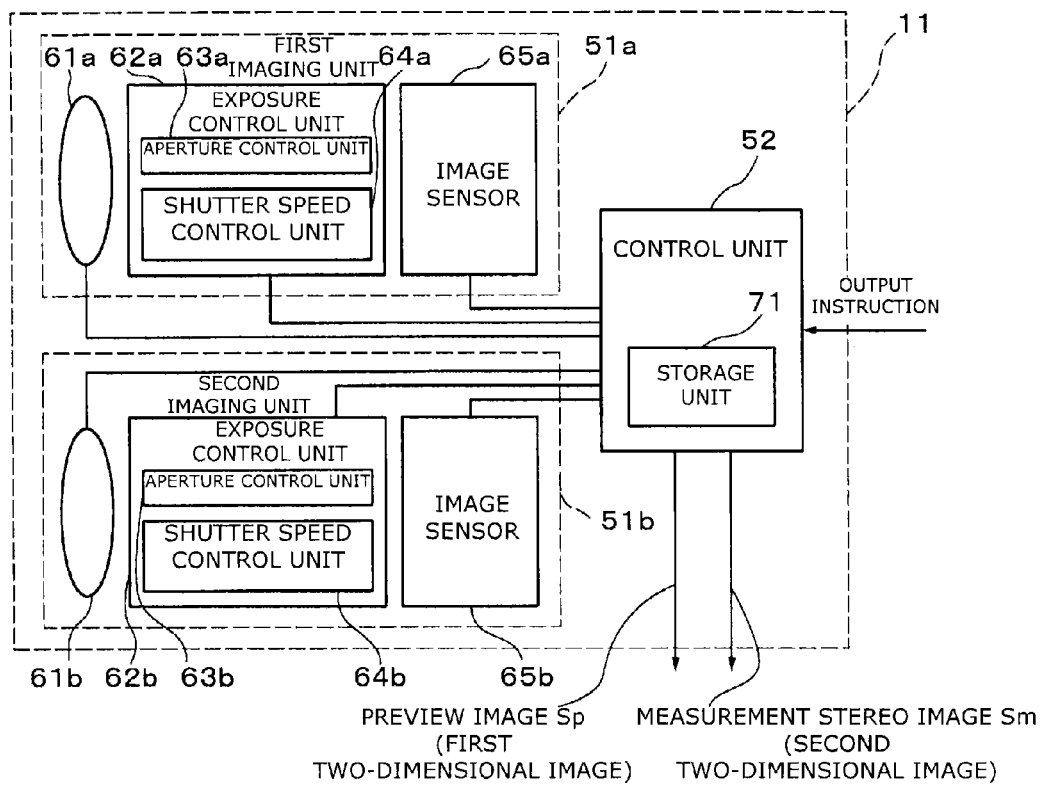
FIG. 2 is a block diagram illustrating a configuration example of an imaging unit 11 illustrated in FIG. 1.

Referring now to FIG. 2, hereinafter is described a configuration example of the imaging unit 11 that has been described with reference to FIG. 1. The imaging unit 11 illustrated in FIG. 2 is provided with a first imaging unit 51a, a second imaging unit 51b, and a control unit 52. The first and second imaging units 51a and 51b are image sensors having an identical configuration. The first imaging unit 51a is provided with an optical system 61a, an exposure control unit 62a, and an image sensor 65a. The second imaging unit 51b is provided with an optical system 61b, an exposure control unit 62b, and an image sensor 65b having a configuration identical with the optical system 61a, the exposure control unit 62a, and the image sensor 65a, respectively. The first and second imaging units 51a and 51b are disposed in the imaging unit 11, at mutually different positions and in mutually different directions. The optical systems 61a and 61b are provided with one or more lenses, a lens driving mechanism for changing the focal length telescopically or in a wide angle, and a lens driving mechanism for automatic focusing. The exposure control units 62a and 62b are provided with aperture control units 63a and 63b, and shutter speed control units 64a and 64b. The aperture control units 63a and 63b are provided with a mechanical variable aperture system, and a driving unit for driving the variable aperture system, and discharge the light that is incident from the optical systems 61a and 61b by varying the amount of the light. The shutter speed control units 64a and 64b are provided with a mechanical shutter, and a driving unit for driving the mechanical shutter to block the light incident from the optical systems 61a and 61b, or allow passage of the light for a predetermined period of time. The shutter speed control units 64a and 64b may use an electronic shutter instead of the mechanical shutter.

The image sensors 65a and 65b introduce the reflected light from an object via the optical systems 61a and 61b and the exposure control units 62a and 62b, and output the light after being converted into an electrical signal. The image sensors 65a and 65b configure pixels with a plurality of light-receiving elements arrayed in a matrix lengthwise and widthwise on a plane (a pixel herein refers to a recording unit of an image). The image sensors 65a and 65b may be or may not be provided with respective color filters conforming to the pixels. The image sensors 65a and 65b have respective driving circuits for the light-receiving elements, conversion circuits for the output signals, and the like, and convert the light received by the pixels into a digital or analog predetermined electrical signal to output the converted signal to the control unit 52 as a pixel signal. The image sensors 65a and 65b that can be used include ones capable of varying the readout resolution of the pixel signal in accordance with an instruction from the control unit 52.

The control unit 52 controls the optical systems 61a and 61b, the exposure control units 62a and 62b, and the image sensors 65a and 65b provided in the first and second imaging units 51a and 51b, respectively. The control unit 52 repeatedly inputs the pixel signals outputted by the first and second imaging units 51a and 51b at a predetermined frame cycle, for output as a preview image Sp (corresponding to the first two-dimensional image in FIG. 1), with the pixel signals being combined on a frame basis. The control unit 52 changes, for example, the imaging conditions at the time of capturing the preview image Sp to predetermined imaging conditions in accordance with the output instruction inputted from the output instruction generation unit 12. At the same time, under the above predetermined imaging conditions, the control unit 52 inputs the pixel signals, which correspond to one frame or a predetermined number of frames, read out from the first and second imaging units 51a and 51b. For example, the control unit 52 combines, on a frame basis, the image signals captured under the imaging conditions changed in accordance with the output instruction, and outputs the combined signals as a measurement stereo image Sm (corresponding to the second two-dimensional image in FIG. 1) (n denotes herein an integer from 1 to N representing a pair number). The preview image Sp is a name representing two types of images, one being an image including one preview image for each frame, and the other being an image including two preview images for each frame. When specified the preview image Sp that contains two preview images captured by a stereo camera, the preview image Sp is termed as a preview stereo image Sp.

The control unit 52 may be provided with a storage unit 71 therein. In this case, the control unit 52 may acquire image data whose resolution is the same as that of the measurement stereo image Sm (second two-dimensional image) when outputting the preview image Sp (first two-dimensional image). In this case, the control unit 52 may temporarily store the image data in the storage unit 71 therein, and extract only predetermined pixels. Further, in this case, the control unit 52 may output the extracted pixels as the preview image Sp having a resolution lower than the measurement stereo image Sm, to the output instruction generation unit 12 and the storage unit 13. In this case, when the output instruction is supplied from the output instruction generation unit 12, the control unit 52 reads the image data, as the preview image Sp, corresponding to the output instruction, from its internal storage unit 71 and outputs the data, as it is, as the measurement stereo image Sm with the resolution at the time of capture. Then, the control unit 52 deletes, the image data rendered to be the measurement stereo image Sm inclusive, and the image data captured at an earlier clock time than this image data, from its internal storage unit 71, according to the output instruction. The storage unit inside the imaging unit 71 may have a capacity that is a minimally required capacity necessary for only the storage of the captured image data, as determined by experiment or the like. The captured image data to be stored in this case is captured before the subsequent capture of a measurement stereo image Sm, following the currently stored one.

In the configuration illustrated in FIG. 2, the first and second imaging units 51a and 51b are used as stereo cameras. For example, an internal parameter matrix A of the first imaging unit 51a and an internal parameter matrix A of the second imaging unit 51b are identical. An external parameter matrix M between the first and second imaging units 51a and 51b is set to a predetermined value in advance. Accordingly, by correlating between the pixels (or between subpixels) on the basis of the images concurrently captured by the first and second imaging units 51a and 51b (hereinafter, the pair of images are also referred to as stereo image pair), a three-dimensional shape (i.e., three-dimensional coordinates) can be reconstructed based on the perspective of having captured the images, without uncertainty.

The internal parameter matrix A is also called a camera calibration matrix, which is a matrix for converting physical coordinates related to the imaging object into image coordinates (i.e., coordinates centered on an imaging plane of the image sensor 65a of the first imaging unit 51a and an imaging plane of the image sensor 65b of the second imaging unit 51b, the coordinates being also called camera coordinates). The image coordinates use pixels as units. The internal parameter matrix A is represented by a focal length, coordinates of the image center, a scale factor (=conversion factor) of each component of the image coordinates, and a shear modulus. The external parameter matrix M converts the image coordinates into world coordinates (i.e., coordinates commonly determined for all perspectives and objects). The external parameter matrix M is determined by three-dimensional rotation (i.e., change in posture) and translation (i.e., change in position) between a plurality of perspectives. The external parameter matrix M between the first and second imaging units 51a and 51b can be represented by, for example, rotation and translation relative to the image coordinates of the second imaging unit 51b, with reference to the image coordinates of the first imaging unit 51a. The reconstruction of a three-dimensional shape based on a stereo image pair without uncertainty refers to calculating physical three-dimensional coordinates corresponding to each pixel of the object, from each captured image of the two imaging units whose internal parameter matrix A and the external parameter matrix M are both known. In the embodiment of the present invention, to be uncertain refers to that a three-dimensional shape projected to an image cannot be unequivocally determined.

The imaging unit 11 illustrated in FIG. 1 does not have to be the stereo camera illustrated in FIG. 2 (i.e., configuration using two cameras). For example, the imaging unit 11 may include only one image sensor (i.e., one camera), and two images captured while the image sensor is moved may be used as a stereo image pair. However, in this case, since the external parameter matrix M is uncertain, some uncertainty remains. However, for example, correction can be made using measured data of three-dimensional coordinates for a plurality of reference points of the object or, if measured data is not used, the three-dimensional shape can be reconstructed in a virtual space that premises the presence of uncertainty, not in a real three-dimensional space. The number of cameras is not limited to two, but may be, for example, three or four.

The imaging unit 11 illustrated in FIG. 1 that can be used includes, for example, an imaging unit provided with a depth image generation section and a color image generation section as described in Patent Literature 1. In this case, an imaging unit may be used to change resolution of the depth image, or change resolution of both the depth image and the color image, or change resolution of the color image, in accordance with the output instruction.

Figure 3:
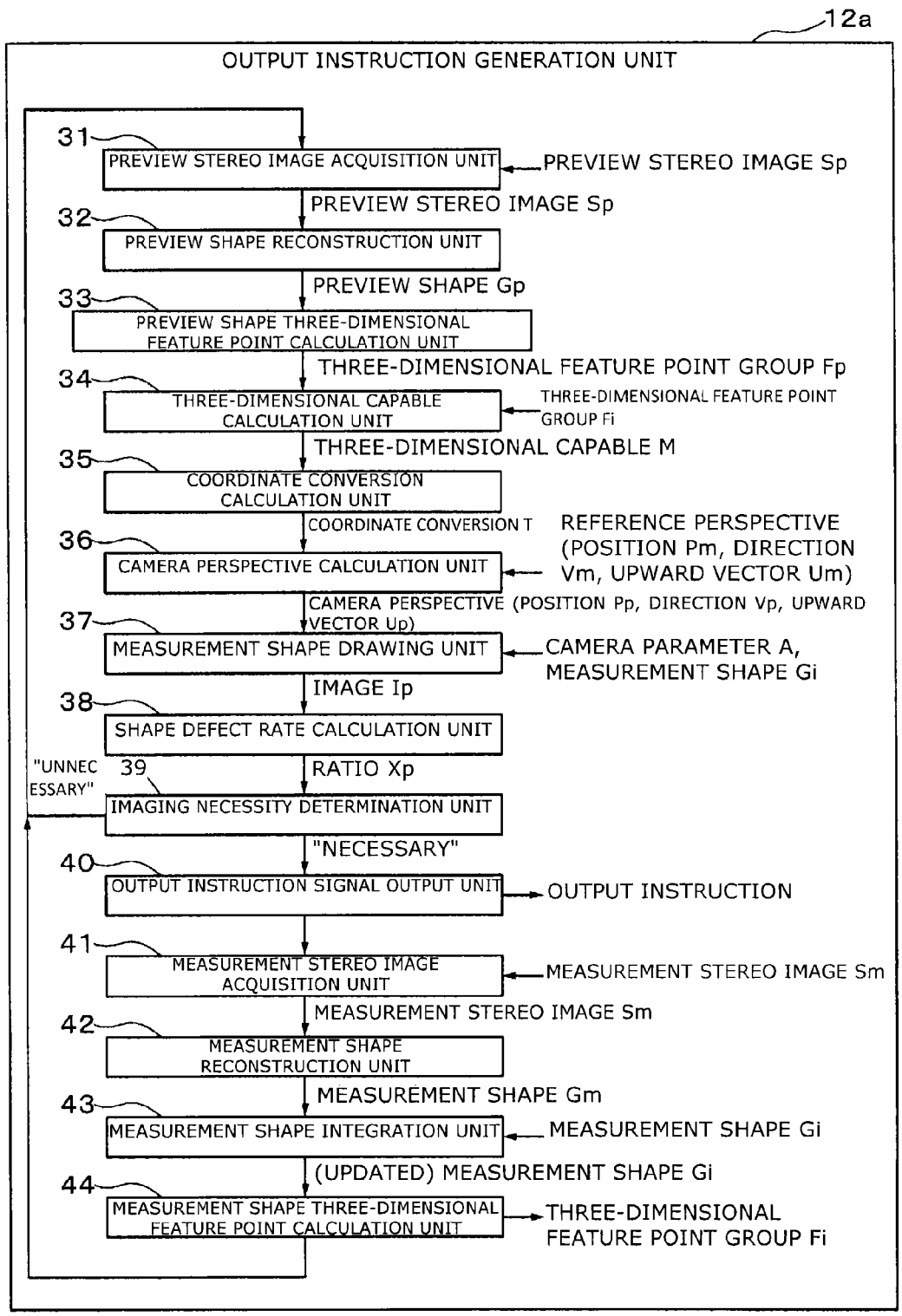
FIG. 3 is a block diagram illustrating a configuration example of an output instruction generation unit 12 illustrated in FIG. 1.

Referring now to FIGS. 3 to 14, hereinafter is described a configuration example of the output instruction generation unit 12 described referring to FIG. 1. An output instruction generation unit 12a illustrated in FIG. 3 generates an output instruction on the basis of a ratio of defect shape (i.e., shape defect ratio) in viewing a three-dimensional model from the perspective of having captured the preview image Sp (first two-dimensional image), the three-dimensional model being based on a measurement stereo image Sm (second two-dimensional image). The shape defect ratio corresponds to a ratio of images which is calculated when a three-dimensional model obtained based on a measurement stereo image Sm (second two-dimensional image) is represented as a two-dimensional image from the perspective of having captured the preview image Sp (first two-dimensional image). In FIG. 3, the configuration corresponding to the output instruction generation unit illustrated in FIG. 1 is illustrated as the output instruction generation unit 12a. For example, the output instruction generation unit 12a may be configured using components, such as a CPU (central processing unit) and a RAM (random access memory), and a program to be executed by the CPU. In FIG. 3, the process (or functions) carried out by executing the program is divided into a plurality of blocks, and indicated as the components of the output instruction generation unit 12a. The output instruction generation unit 12a illustrated in FIG. 3 determines whether or not it is necessary to acquire a next measurement stereo image Sm on the basis of the ratio of shape defect of the three-dimensional model generated from the acquired measurement stereo image Sm. In the embodiment of the present invention, the ratio of shape defect (i.e., shape defect ratio) refers to an extent for the three-dimensional model not to reach a desired point group density. However, the ratio of shape defect may be expressed using other terms (feature value), such as density, acquisition rate, fulfillment rate, and completion rate.

Figure 4:
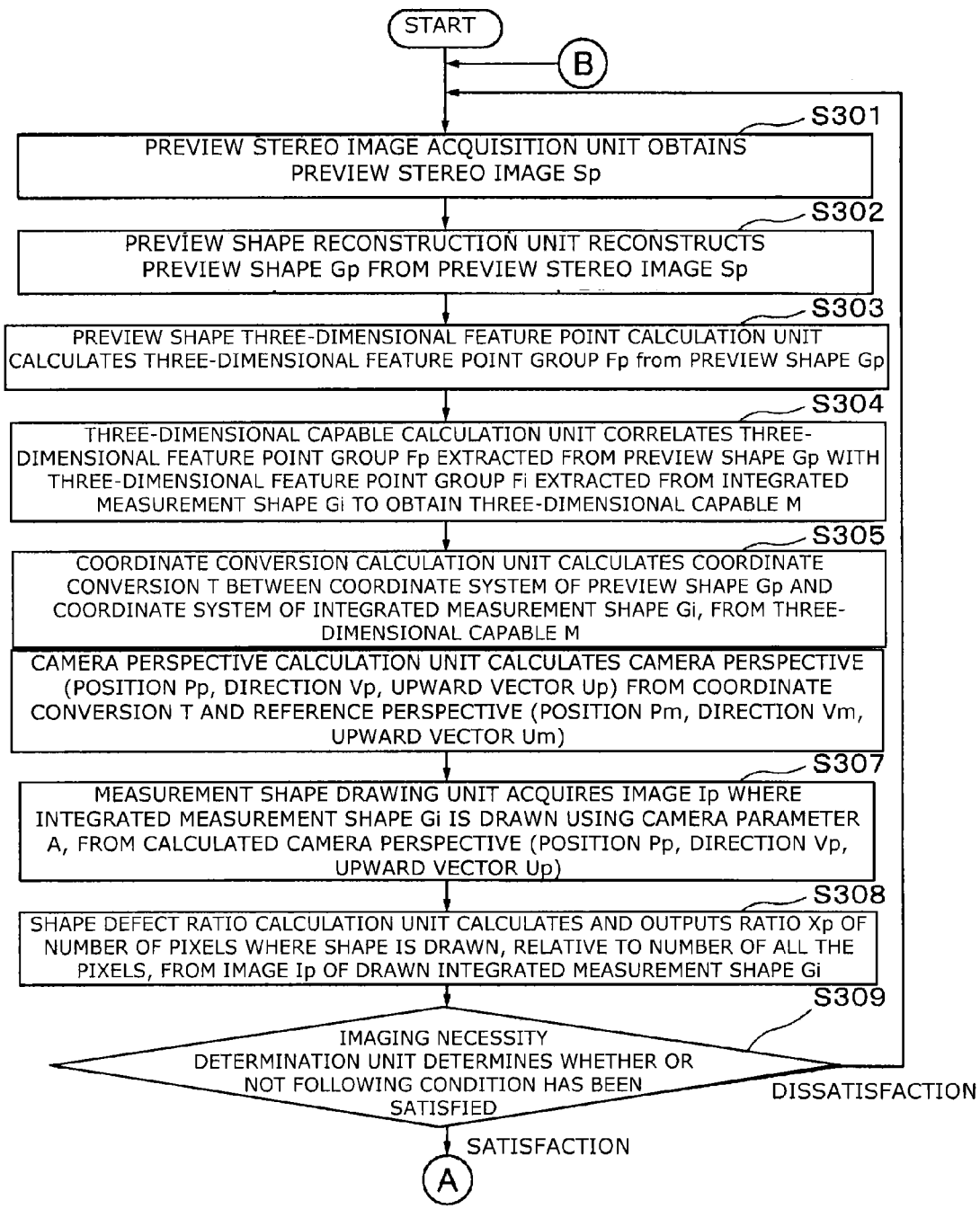
FIG. 4 is a flow chart illustrating an operation example of an output instruction generation unit 12a illustrated in FIG. 3.
Figure 5:
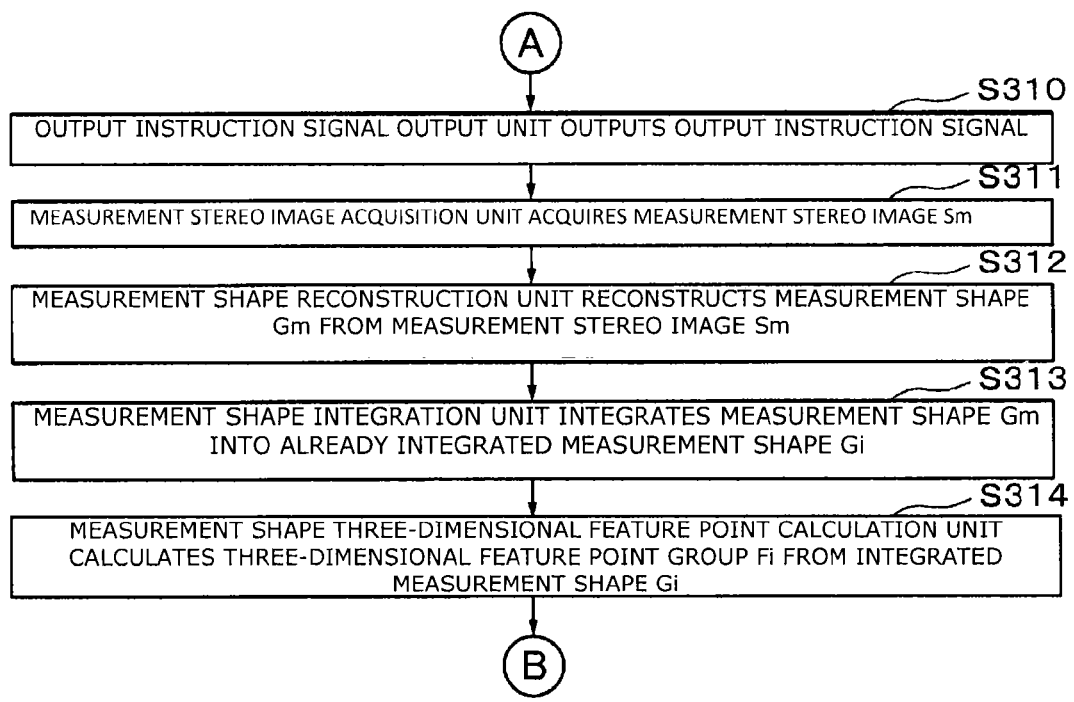
FIG. 5 is a flow chart illustrating an operation example of the output instruction generation unit 12a illustrated in FIG. 3.

FIGS. 4 and 5 show a flow chart of an operation of the output instruction generation unit 12a illustrated in FIG. 3. FIGS. 6 to 14 are diagrams each illustrating an example of the operation of the output instruction generation unit 12a illustrated in FIG. 3.

The output instruction generation unit 12a illustrated in FIG. 3 is provided with a preview stereo image acquisition unit 31, a preview shape reconstruction unit 32, a preview shape three-dimensional feature point calculation unit 33, a three-dimensional correlation calculation unit 34, a coordinate conversion calculation unit 35, a camera perspective calculation unit 36, a measurement shape drawing unit 37, and a shape defect ratio calculation unit 38. The output instruction generation unit 12a is further provided with an imaging necessity determination unit 39, an output instruction signal output unit 40, a measurement stereo image acquisition unit 41, a measurement shape reconstruction unit 42, a measurement shape integration unit 43, and a measurement shape three-dimensional feature point calculation unit 44.

Figure 11:
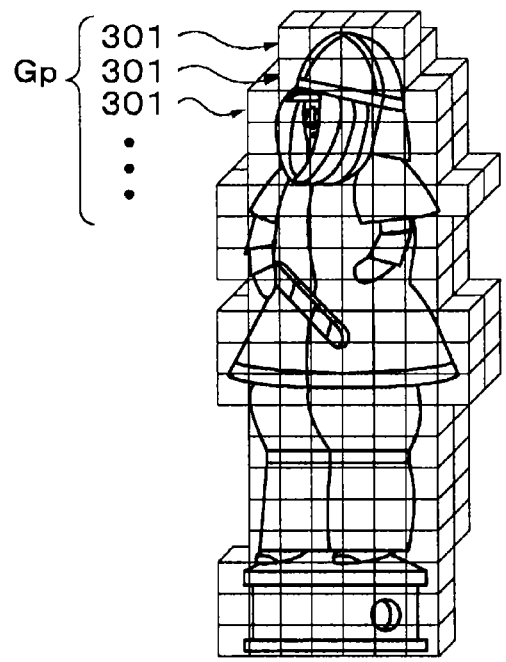
FIG. 11 is a diagram illustrating an operation example of the output instruction generation unit 12a illustrated in FIG. 3.

The preview stereo image acquisition unit 31 inputs a preview stereo image Sp from the imaging unit 11 for each frame and outputs the stereo image Sp to the preview shape reconstruction unit 32. The preview shape reconstruction unit 32 reconstructs a preview shape Gp on the basis of the preview stereo image Sp inputted from the preview stereo image acquisition unit 31. The preview shape Gp herein is represented by a coordinate system viewed from the perspective of having captured the preview stereo image Sp. The preview shape Gp herein is a three-dimensional model reconstructed based on a pair of stereo pair images configuring the preview stereo image Sp, and thus is a point group model representing three-dimensional coordinates of each of the pixels correlated between the pair images. FIGS. 7 and 11 schematically illustrate the preview shape Gp. The preview shape Gp of FIG. 7 schematically illustrates one example of a three-dimensional model reconstructed from a pair of preview stereo images Sp that have captured an imaging object 100, in FIG. 6, from the perspective of a position Pm. On the other hand, the preview shape Gp of FIG. 11 schematically illustrates one example of a three-dimensional model reconstructed from a pair of preview stereo images Sp that have captured the imaging object 100, in FIG. 6, from the perspective of a position Pp after movement. The preview shape Gp of FIGS. 7 and 11 contains a plurality of points 301 located in a three-dimensional space. Data indicating each point 301 only has to include data indicating three-dimensional coordinate values representing the position of each point 301.

Figure 6:
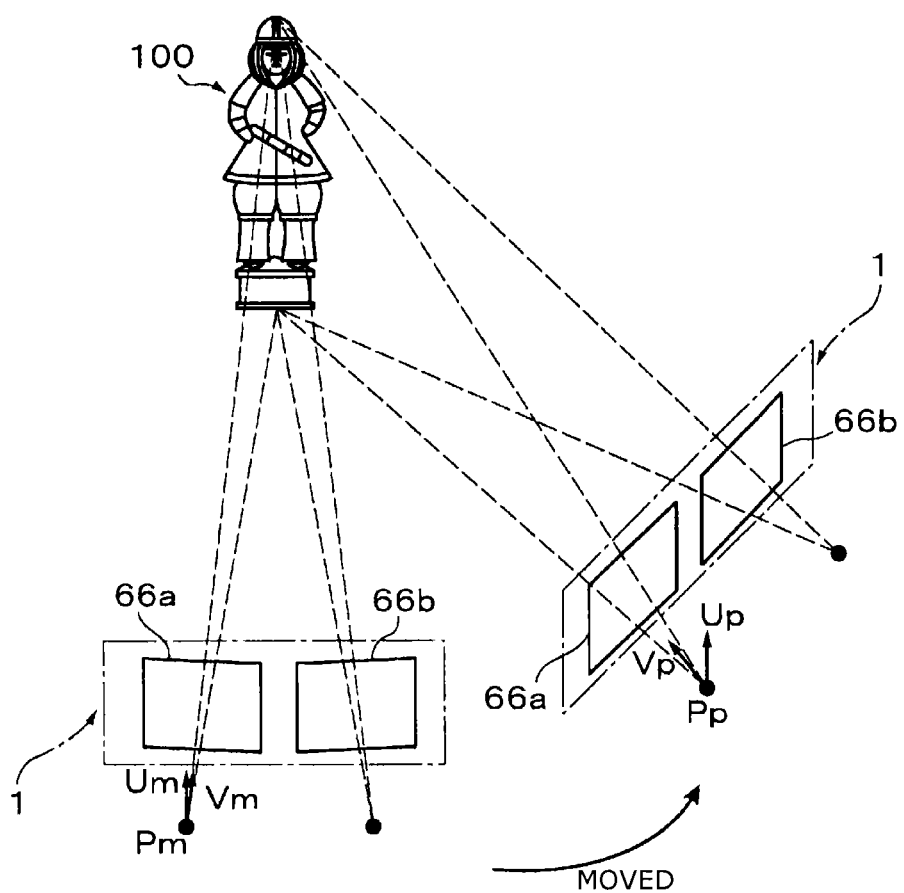
FIG. 6 is a schematic diagram illustrating an example of measuring an object using the imaging unit 11 illustrated in FIG. 2.
Figure 7:
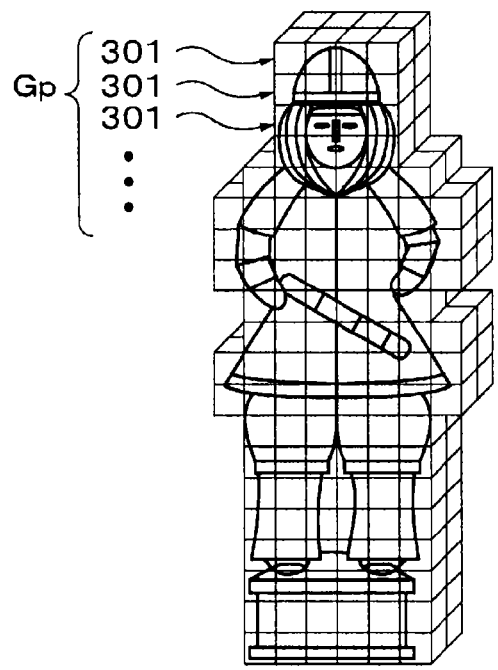
FIG. 7 is a diagram illustrating an operation example of the output instruction generation unit 12a illustrated in FIG. 3.

FIG. 6 is a diagram schematically illustrating an operation of imaging the imaging object 100, while the three-dimensional shape measurement device 1 described referring to FIGS. 1 to 3 is moved around the object in a direction of the arrow.

In this case, FIG. 6 illustrates a positional relationship in respect of the two imaging units 51a and 51b of the three-dimensional shape measurement device 1, that is, a positional relationship between an imaging plane (or an image plane) 66a formed by the image sensor 65a of the imaging unit 51a, and an imaging plane 66b formed by the image sensor 65b of the imaging unit 51b. The imaging plane 66a is at a position of a perspective (i.e., a focus or an optical center) indicated by a three-dimensional coordinate point Pm, and has a vector, indicated by Vm, representing the direction of an optical axis as a straight line perpendicularly drawn from Pm to the imaging plane 66a, and an upward vector, indicated by Um, parallel to the imaging plane 66a. In addition, the position of the perspective after movement is indicated by a three-dimensional coordinate point p, while a vector representing the direction of an optical axis is indicated by Vp, and an upward vector parallel to the imaging plane 66a is indicated by Up. The perspectives indicated by Pm, Vm, and Um are the perspectives of the first image capture and are used as reference perspectives in the world coordinates by the output instruction generation unit 12a.

Figure 8:
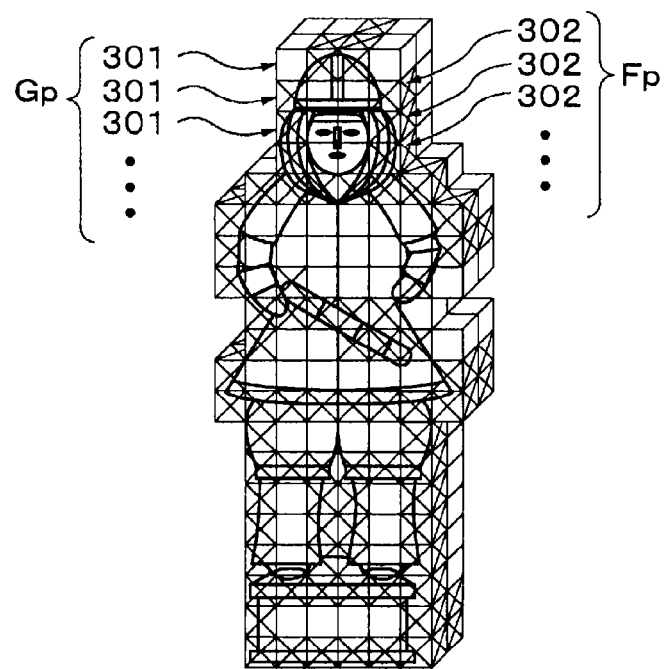
FIG. 8 is a diagram illustrating an operation example of the output instruction generation unit 12a illustrated in FIG. 3.
Figure 12:
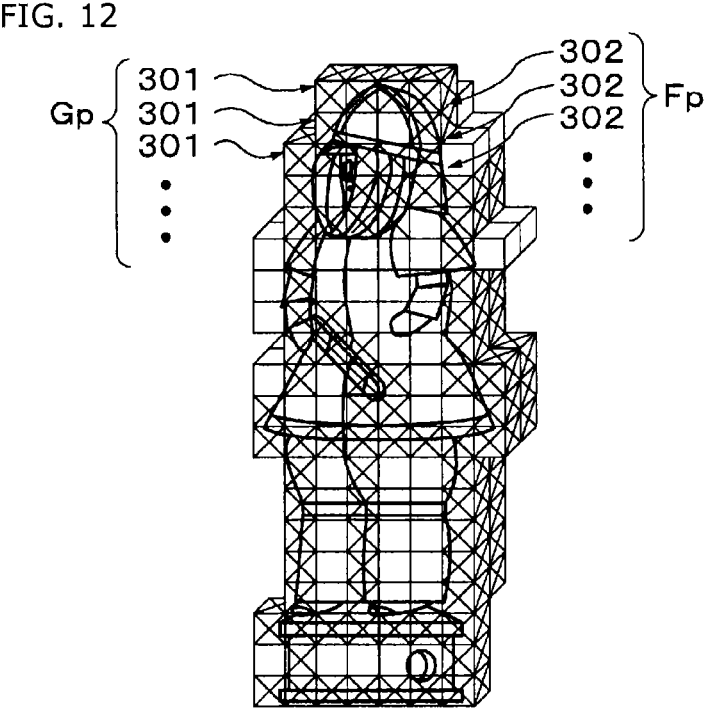
FIG. 12 is a diagram illustrating an operation example of the output instruction generation unit 12a illustrated in FIG. 3.

The preview shape three-dimensional feature point calculation unit 33 extracts and outputs a three-dimensional feature point group Fp from the preview shape Gp reconstructed by the preview shape reconstruction unit 32. FIGS. 8 and 12 schematically illustrate examples of the three-dimensional feature point group Fp. The three-dimensional feature point group Fp illustrated in FIG. 8 is configured to contain 0 or more feature points 302 extracted according to predetermined conditions from among the plurality of points 301 configuring the preview shape Gp shown in FIG. 7. The three-dimensional feature point group Fp illustrated in FIG. 12 is configured to contain 0 or more feature points 302 extracted according to predetermined conditions from among the plurality of points 301 configuring the preview shape Gp shown in FIG. 11.

Figure 9:
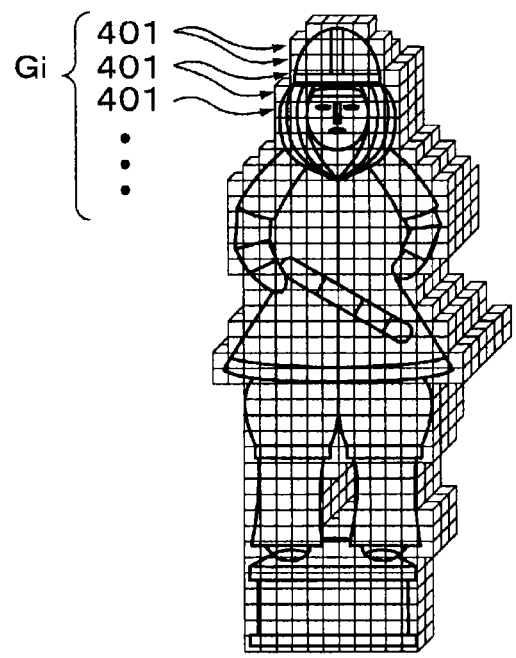
FIG. 9 is a diagram illustrating an operation example of the output instruction generation unit 12a illustrated in FIG. 3.
Figure 10:
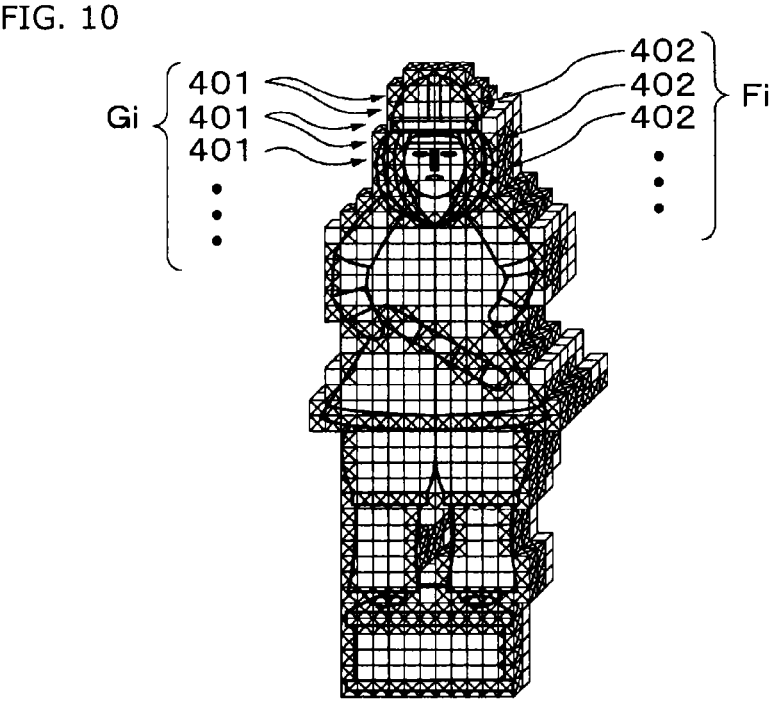
FIG. 10 is a diagram illustrating an operation example of the output instruction generation unit 12a illustrated in FIG. 3.

The three-dimensional correlation calculation unit 34 carries out a calculation process of correlating the three-dimensional feature point group Fp extracted from the preview shape Gp, with a three-dimensional feature point group Fi extracted from a measurement shape Gi, and outputs a three-dimensional correlation matrix M (hereinafter, referred to as a three-dimensional correlation M) representing the result of correlation. The measurement shape Gi herein is a three-dimensional model obtained by the measurement shape integration unit 43 and represents a point group model reconstructed based on the measurement stereo image Sm. The measurement shape Gi is represented in the world coordinate system viewed from the reference perspective represented by Pm, Vm, and Um. FIG. 9 schematically illustrates one example of the measurement shape Gi. The measurement shape Gi illustrated in FIG. 9 contains a plurality of points 401 located in a three-dimensional space. Data indicating each point 401 only has to include data indicating three-dimensional coordinate values representing a position of each point 401. FIG. 10 schematically illustrates one example of the three-dimensional feature point group Fi extracted from the measurement shape Gi. The three-dimensional feature point group Fi illustrated in FIG.

10 is configured to contain 0 or more feature points 402 extracted according to predetermined conditions from among the plurality of points 401 configuring the measurement shape Gi shown in FIG. 9.

The coordinate conversion calculation unit 35 calculates and outputs a coordinate conversion matrix T (hereinafter, referred to as coordinate conversion T) representing coordinate conversion between a coordinate system of the preview shape Gp and a coordinate system of the measurement shape Gi, on the basis of the three-dimensional correlation M. For example, the coordinate system of the preview shape Gp is one viewed from an unknown perspective after movement as illustrated in FIG. 6 (position Pp, direction Vp, and upward vector Up). On the other hand, the coordinate system of the measurement shape Gi is the world coordinate system viewed from the reference perspective as illustrated in FIG. 6 (position Pm, direction Vm, and upward vector Um).

The camera perspective calculation unit 36 calculates and outputs an imaging perspective (position Pp, direction Vp, and upward vector Up) in capturing the preview stereo image Sp on the basis of the coordinate conversion T and each parameter representing the reference perspective (position Pm, direction Vm, and upward vector Um).

Figure 13:
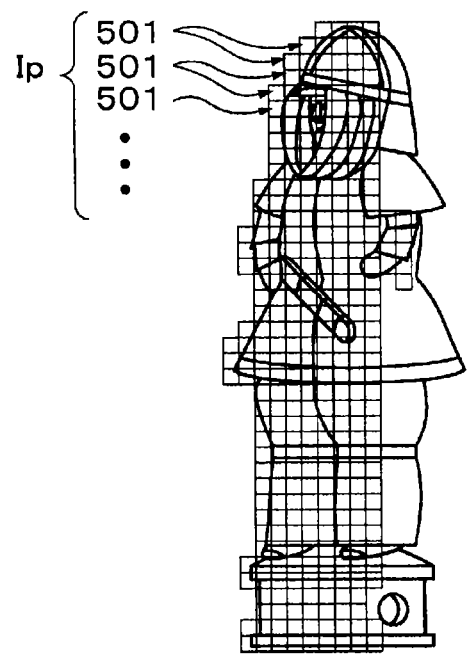
FIG. 13 is a diagram illustrating an operation example of the output instruction generation unit 12a illustrated in FIG. 3.

The measurement shape drawing unit 37 calculates a two-dimensional image Ip that draws the measurement shape Gi from an imaging perspective (position Pp, direction Vp, and upward vector Up), the measurement shape Gi having been obtained by the measurement shape integration unit 43. In the calculation, the unit 37 uses the imaging perspective (position Pp, direction Vp, and upward vector Up) calculated by the camera perspective calculation unit 36 and an internal parameter A of a camera (i.e., a parameter representing each element of the internal parameter matrix A). FIG. 13 schematically illustrates one example of the image Ip. The image Ip is configured by a plurality of pixels 501. Although the example illustrated in FIG. 13 shows only the pixels corresponding to the imaging object 100 illustrated in FIG. 6, the image Ip may be an image covering the overall surface of the two-dimensional image including a part or all of the background.

Figure 14:
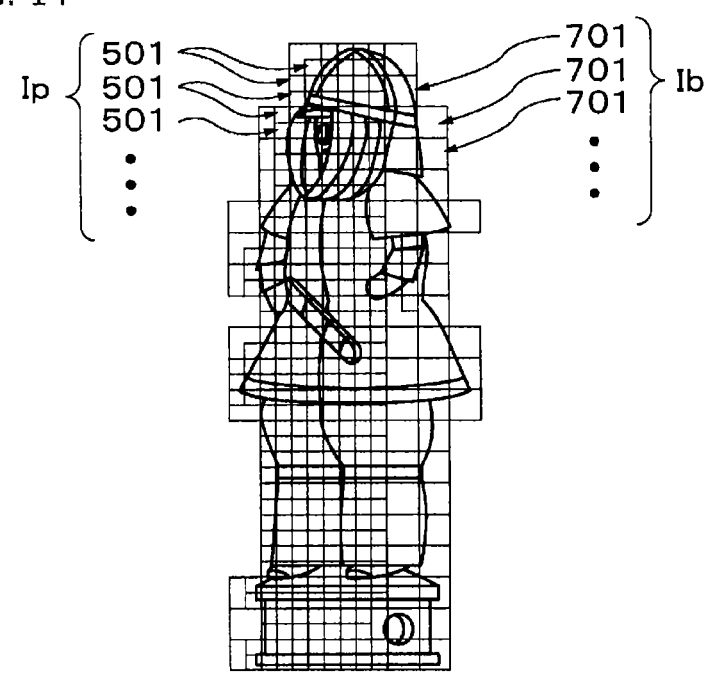
FIG. 14 is a diagram illustrating an operation example of the output instruction generation unit 12a illustrated in FIG. 3.

The shape defect ratio calculation unit 38 calculates a ratio Xp of the number of pixels in which the shape is drawn, relative to the number of all the pixels, from the image Ip representing the integrated measurement shape Gi drawn by the measurement shape drawing unit 37. The ratio Xp refers to a value representing the shape defect ratio. The ratio Xp may be calculated using the number of all the pixels as the denominator, or may be calculated using the number of pixels included in some region in the image as the denominator. That is to say, the number of all the pixels may represent the number of pixels in the entire image, or may represent the number of all pixels included in a part of region in the image. For example, in the case where the object is large and extends throughout the entire surface of the captured image, it may sometimes be desirable to calculate the ratio Xp using the number of all the pixels in the image as the denominator. In contrast, as illustrated in FIG. 13, in the case where the object is relatively small and the object is imaged during movement around the object, it may be sometimes desirable that the ratio Xp is calculated using the number of all the pixels included in a part of region in the image as the denominator. The case of using the number of all the pixels included in a part of region as the denominator may include the case as illustrated in FIG. 14, for example, where a region containing a boundary of the object is recognized from the preview stereo image Sp, and the number of pixels contained within the boundary is used as the denominator. FIG. 14 illustrates the image Ip illustrated in FIG. 13 overlapped with an image Ib composed of a plurality of pixels 701 representing the region of the imaging object 100 recognized from the preview stereo image Sp. In this case, the ratio Xp is calculated using the number of pixels in the image Ib (a converted value taking account of the resolution of the image Ip is used) as the denominator, and using the number of pixels of the image Ip as the numerator.

The imaging necessity determination unit 39 compares the ratio Xp calculated by the shape defect ratio calculation unit 38 with a predetermined threshold Xt to determine whether or not it is necessary to acquire the measurement stereo image Sm at the perspective position at the time of acquiring the preview stereo image Sp by the preview stereo image acquisition unit 31. The predetermined threshold Xt is a value used as a reference for determining whether or not the ratio Xp indicating the shape defect ratio implies the necessity of acquiring the measurement stereo image Sm. The threshold Xt that can be used may be a value set in advance, or may be a variable value in conformity with the number of pairs or the like of the acquired measurement stereo images Sm. When a condition Xp<Xt is satisfied, the imaging necessity determination unit 39 determines that it is necessary to acquire a next measurement stereo image Sm. In contrast, when the condition Xp<Xt is not satisfied, the imaging necessity determination unit 39 determines that it is unnecessary to acquire a next measurement stereo image Sm. If it is determined that it is necessary to acquire a next measurement stereo image Sm from the perspective (or substantially the same perspective) of having captured the preview stereo image Sp last, the imaging necessity determination unit 39 outputs a signal indicating accordingly (determination result) to the output instruction signal output unit 40. In contrast, if it is determined that the acquisition is unnecessary, the imaging necessity determination unit 39 outputs a signal indicating accordingly (determination result) to the preview stereo image acquisition unit 31.

When a signal indicating that it is necessary to acquire a next measurement stereo image Sm is inputted from the imaging necessity determination unit 39, the output instruction signal output unit 40 outputs an output instruction signal to the imaging unit 11 and the like. When a signal indicating that it is unnecessary to acquire a next measurement stereo image Sm is inputted from the imaging necessity determination unit 39, the preview stereo image acquisition unit 31 carries out a process of acquiring a next preview stereo image Sp (e.g., carries out a process of keeping a standby-state until a next preview stereo image Sp is outputted from the imaging unit 11).

The measurement stereo image acquisition unit 41 acquires the measurement stereo image Sm captured by the imaging unit 11, according to the output instruction signal outputted by the output instruction signal output unit 40 and outputs the acquired image to the measurement shape reconstruction unit 42.

The measurement shape reconstruction unit 42 reconstructs a measurement shape Gm on the basis of the measurement stereo image Sm. The measurement shape Gm represents a point group model reconstructed based on the measurement stereo image Sm. The measurement shape Gm is represented by a coordinate system which is based on the perspective of the imaging unit 11 that has acquired the measurement stereo image Sm.

The measurement shape integration unit 43 integrates the measurement shape Gm reconstructed by the measurement shape reconstruction unit 42 into the measurement shape Gi, which is a three-dimensional model generated from one or more measurement shapes Gm reconstructed up to then, and outputs the updated measurement shape Gi (see FIG. 9). In this case, for example, the measurement shape integration unit 43 converts the coordinate system of the measurement shape Gm to the coordinate system of the measurement shape Gi, that is, the world coordinate system, in accordance with the result of estimating the movement of the imaging unit 11 on the basis of the result of tracking the plurality of feature points contained in the preview stereo image Sp. Alternatively, the measurement shape integration unit 43 may convert the coordinate system of the measurement shape Gm to the coordinate system of the measurement shape Gi, that is, the world coordinate system, in accordance with the result of estimating the movement of the imaging unit 11 on the basis of the result of tracking the plurality of feature points contained in the measurement stereo image Sm. In this case, more accurate coordinate conversion can be performed compared with the case of estimation based on the result of tracking the plurality of feature points contained in the preview stereo image Sp.

The measurement shape three-dimensional feature point calculation unit 44 calculates the three-dimensional feature point group Fi from the measurement shape Gi integrated by the measurement shape integration unit 43 (see FIG. 10). When the measurement shape three-dimensional feature point calculation unit 44 calculates the three-dimensional feature point group Fi, the preview stereo image acquisition unit 31 carries out a process of obtaining a next preview stereo image Sp.

Referring now to FIGS. 4 and 5, hereinafter is described an operation example of the three-dimensional shape measurement device 1 provided with the output instruction generation unit 12a illustrated in FIG. 3. The flows in FIGS. 4 and 5 are connected to each other by a pair of connectors A and a pair of connectors B. For example, when a user carries out a predetermined instruction operation, the preview stereo image acquisition unit 31 acquires a preview stereo image Sp, in the output instruction generation unit 12a (step S301). Then, the preview shape reconstruction unit 32 reconstructs a preview shape Gp from the preview stereo image Sp (step S302). Then, the preview shape three-dimensional feature point calculation unit 33 calculates a three-dimensional feature point group Fp from the preview shape Gp (step S303). Then, the three-dimensional correlation calculation unit 34 correlates the three-dimensional feature point group Fp extracted from the preview shape Gp with a three-dimensional feature point group Fi extracted from an integrated measurement shape Gi to obtain a three-dimensional correlation M (step S304). Then, the coordinate conversion calculation unit 35 calculates, from the three-dimensional correlation M, a coordinate conversion T between the coordinate system of the preview shape Gp and the coordinate system of the integrated measurement shape Gi (step S305). Then, the camera perspective calculation unit 36 calculates a camera perspective (position Pp, direction Vp, and upward vector Up) of the preview stereo image Sp, from the coordinate conversion T and a reference perspective (position Pm, direction Vm, and upward vector Um) (step S306).

Then, the measurement shape drawing unit 37 obtains an image Ip in which the integrated measurement shape Gi is drawn using a camera parameter A, from the calculated camera perspective (position Pp, direction Vp, and upward vector Up) (step S307). Then, the shape defect ratio calculation unit 38 calculates a ratio Xp of the number of pixels in which a shape is drawn, relative to the total number of pixels, from the image Ip of the drawn integrated measurement shape Gi (step S308). Then, the imaging necessity determination unit 39 determines whether or not the following condition has been satisfied (condition: Xp<Xt) (step S309).

If the condition is satisfied, the output instruction signal output unit 40 outputs an output instruction signal (step S310). Then, the measurement stereo image acquisition unit 41 acquires a measurement stereo image Sm (step S311). Then, the measurement shape reconstruction unit 42 reconstructs a measurement shape Gm from the measurement stereo image Sm (step S312). Then, the measurement shape integration unit 43 integrates the measurement shape Gm into the already integrated measurement shape Gi (step S313). Then, the measurement shape three-dimensional feature point calculation unit 44 calculates a three-dimensional feature point group Fi from the integrated measurement shape Gi (step S314). The process then returns to step S301 to repeatedly execute the above process.

In contrast, if the condition is not satisfied at step S309, the process returns to step S301 to repeatedly execute the above process.

As described above, in the three-dimensional shape measurement device 1 of the present embodiment, whether or not it is necessary to acquire a next measurement stereo image Sm (second two-dimensional image) is determined based on a sequentially captured preview stereo image Sp (first two-dimensional image) and a measurement stereo image Sm (second two-dimensional image) that is an object to be processed in generating a three-dimensional model. Accordingly, for example, the acquisition timing can be appropriately set based on the preview stereo image Sp (first two-dimensional image), and the quantity of images to be obtained can be appropriately set based on the measurement stereo image Sm (second two-dimensional image). Thus, the acquisition timing can be more easily and appropriately set compared with the case of periodical acquisition.

The output instruction generation unit 12a of the present embodiment determines whether or not it is necessary to obtain a next measurement stereo image Sm (second two-dimensional image) on the basis of a shape defect ratio in viewing a three-dimensional model Gi from the perspective of having captured the preview stereo image Sp (first two-dimensional image), the three-dimensional model Gi being based on a measurement stereo image Sm (second two-dimensional image). Accordingly, shortage of the measurement stereo image(s) Sm (second two-dimensional image) necessary for generating a three-dimensional model can be accurately estimated, and thus the necessity of acquisition can be accurately determined. The shape defect ratio corresponds to the ratio of image Ip that can be calculated when the three-dimensional model Gi obtained based on the measurement stereo image Sm (second two-dimensional image) is represented as a two-dimensional image from the perspective of having captured the preview stereo image Sp (first two-dimensional image). Accordingly, the necessity of acquisition can be accurately determined taking account of the position and the direction of the imaging unit 11.

When the imaging unit 11 has a function of outputting a range image, the preview stereo image Sp (first two-dimensional image) can be taken, for example, as a range image with a low resolution, and the measurement stereo image Sm (second two-dimensional image) can be taken, for example, as a range image with a high resolution. In this case, a three-dimensional model can be calculated using depth information (or, depth value, width value, and distance information) of each pixel contained in the depth image.

The present invention is not limited to the foregoing embodiments. For example, the three-dimensional shape measurement device 1 may be provided, for example, with a display or the like for displaying a three-dimensional model reconstructed based on a captured image. Specifically, the three-dimensional shape measurement device 1 may be appropriately modified by, for example, providing the device with a configuration for reconstructing a three-dimensional model or for outputting the result of reconstruction. The three-dimensional shape measurement device 1 can be configured using one or more CPUs and a program to be executed by the CPUs. In this case, the program can be distributed, for example, via computer-readable recording media and communication lines.

In the three-dimensional shape measurement systems described in Non-Patent Literatures 1 and 2, a plurality of two-dimensional images are captured while an imaging unit is moved, and a three-dimensional model of an object is generated based on the plurality of captured two-dimensional images. In such a configuration, since a two-dimensional image that is subjected to a process of generating a three-dimensional model is periodically captured, there may be areas that are not imaged when, for example, the moving speed of the imaging unit is high. In contrast, when the moving speed of the imaging unit is low, overlapped areas may be increased between a plurality of images. In addition, there may be a situation where there is an area whose image is desired to be captured more densely and an area desired to be captured otherwise, depending on the complexity of the shape of an object. For example, when a user is not skilled, it may sometimes be difficult to pick up an image in an appropriate direction and with appropriate frequency. That is, in the case of capturing a plurality of two-dimensional images that are subjected to a process of generating a three-dimensional model, periodical capturing of images may disable appropriate acquisition of two dimensional images when, for example, the moving speed is high or low, or the shape of the object is complex. When unnecessary overlapped imaging is increased, the two-dimensional images are excessively increased. This may lead to a possibility that an amount of memory, i.e. image data to be stored, is unavoidably increased or extra processing is required to be performed. In this way, there has been a problem that, when a two-dimensional image subjected to a process of generating a three-dimensional model is periodically captured, it is sometimes difficult to appropriately capture a plurality of images.

The present invention has been made considering the above situations, and has as its object to provide a three-dimensional shape measurement device, a three-dimensional shape measurement method, and a three-dimensional shape measurement program that are capable of appropriately capturing a two-dimensional image that is subjected to a process of generating a three-dimensional model.

In order to solve the above problems, a three-dimensional shape measurement device according to a first aspect of the present invention includes: an imaging unit sequentially outputting a captured predetermined two-dimensional image (hereinafter, referred to as a first two-dimensional image), while outputting a two-dimensional image (hereinafter, referred to as a second two-dimensional image) with a setting different from that of the captured first two-dimensional image, according to a predetermined output instruction; an output instruction generation unit generating the output instruction on the basis of a shape defect ratio in viewing a three-dimensional model from a perspective of having captured the first two-dimensional image, the three-dimensional model being based on the second two-dimensional image outputted by the imaging unit; and a storage unit storing the second two-dimensional image outputted by the imaging unit.

In the three-dimensional shape measurement device according to the first aspect of the present invention, it is preferred that the first two-dimensional image and the second two-dimensional image have image resolution settings different from each other, and the second two-dimensional image has a higher resolution than the first two-dimensional image.

In the three-dimensional shape measurement device according to the first aspect of the present invention, it is preferred that the shape defect ratio corresponds to an image ratio that can be calculated when the three-dimensional model obtained based on the second two-dimensional image is represented as a two-dimensional image from a perspective of having captured the first two-dimensional image.

In the three-dimensional shape measurement device according to the first aspect of the present invention, it is preferred that the first two-dimensional image and the second two-dimensional image have different settings in at least one of a shutter speed, an aperture, and sensitivity of an image sensor in capturing an image.

It is preferred that the three-dimensional shape measurement device according to the first aspect of the present invention includes an illumination unit illuminating an imaging object, and the imaging unit captures the second two-dimensional image, while the illumination unit carries out predetermined illumination relative to the imaging object, according to the output instruction.

In the three-dimensional shape measurement device according to the first aspect of the present invention, it is preferred that the first two-dimensional image and the second two-dimensional image are depth images.

A three-dimensional shape measurement method according to a second aspect of the present invention, includes: using an imaging unit sequentially outputting a captured predetermined two-dimensional image (hereinafter, referred to as a first two-dimensional image), while outputting a two-dimensional image (hereinafter, referred to as a second two-dimensional image) with a setting different from that of the captured first two-dimensional image, according to a predetermined output instruction; generating the output instruction (output instruction generation step) on the basis of a shape defect ratio in viewing a three-dimensional model from a perspective of having captured the first two-dimensional image, the three-dimensional model being based on the second two-dimensional image outputted by the imaging unit; and storing (storage step) the second two-dimensional image outputted by the imaging unit.

A three-dimensional shape measurement program according to a third aspect of the present invention uses an imaging unit sequentially outputting a captured predetermined two-dimensional image (hereinafter, referred to as a first two-dimensional image), while outputting a two-dimensional image (hereinafter, referred to as a second two-dimensional image) with a setting different from that of the captured first two-dimensional image, according to a predetermined output instruction, and allows a computer to execute: an output instruction generation step of generating the output instruction on the basis of a shape defect ratio in viewing a three-dimensional model from a perspective of having captured the first two-dimensional image, three-dimensional model being based on the second two-dimensional image outputted by the imaging unit; and a storage step of storing the second two-dimensional image outputted by the imaging unit.

According to the aspects of the present invention, based on a first two-dimensional image, which is sequentially outputted, and a second two-dimensional image with a setting different from that of the first two-dimensional image, an output instruction for the second two-dimensional image is generated to the imaging unit on the basis of a shape defect ratio in viewing a three-dimensional model from the perspective of having captured the first two-dimensional image, the three-dimensional model being based on the second two-dimensional image. Accordingly, compared with the case of periodically capturing an image, the timing of capturing an image and the quantity of images to be captured can be appropriately and easily set.

REFERENCE SIGNS LIST

1 Three-Dimensional Shape Measurement Device
11 Imaging Unit
12, 12a Output Instruction Generation Unit
13 Storage Unit
14 Illumination Unit Obviously, numerous modifications and variations of the present invention are possible in light of the above teachings. It is therefore to be understood that within the scope of the appended claims, the invention may be practiced otherwise than as specifically described herein.

What is claimed is:

1. A device for measuring a three-dimensional shape, comprising:
   an imaging unit configured to sequentially output a first two-dimensional image being captured and to output a second two-dimensional image according to an output instruction, the second two-dimensional image having a setting different from a setting of the first two-dimensional image;
   an output instruction generation unit configured to generate the output instruction based on a shape defect ratio obtained by generating a three-dimensional model based on the second two-dimensional image outputted by the imaging unit and viewing a three-dimensional model from a viewpoint at which the first two-dimensional image is captured; and
   a storage unit configured to store the second two-dimensional image outputted by the imaging unit.

2. The device according to claim 1, wherein the first two-dimensional image and the second two-dimensional image have image resolution settings different from each other, and the second two-dimensional image has a higher resolution than the first two-dimensional image.

3. The device according to claim 1, wherein the first two-dimensional image and the second two-dimensional image have different settings in at least one of a shutter speed, an aperture, and sensitivity of an image sensor in capturing an image.

4. The device according to claim 2, wherein the first two-dimensional image and the second two-dimensional image have different settings in at least one of a shutter speed, an aperture, and sensitivity of an image sensor in capturing an image.

5. The device according to claim 1, further comprising:
   an illumination unit configured to illuminate an imaging object,
   wherein the imaging unit is configured to capture the second two-dimensional image, and the illumination unit is configured to perform illumination of the imaging object, according to the output instruction.

6. The device according to claim 1, wherein the first two-dimensional image and the second two-dimensional image are depth images.

7. A method of measuring a three-dimensional shape, comprising:
   controlling an imaging unit to sequentially output a first two-dimensional image being captured and to output a second two-dimensional image having a setting different from a setting of the captured first two-dimensional image, according to an output instruction,
   generating the output instruction based on a shape defect ratio obtained by generating a three-dimensional model based on the second two-dimensional image outputted by the imaging unit and viewing a three-dimensional model from a viewpoint at which the first two-dimensional image is captured; and
   storing the second two-dimensional image outputted by the imaging unit.

8. A non-transitory computer-readable medium including computer executable instructions, wherein the instructions, when executed by a computer, cause the computer to perform a method of measuring a three-dimensional shape, comprising:
   sequentially outputting a first two-dimensional image being captured, while outputting a second two-dimensional image with a setting different from a setting of the first two-dimensional image, according to an output instruction;
   generating the output instruction based on a shape defect ratio obtained by generating a three-dimensional model based on the second two-dimensional image outputted by the imaging unit and viewing a three-dimensional model from a viewpoint at which the first two-dimensional image is captured; and
   storing the second two-dimensional image outputted by the imaging unit.

* * * * *